US009709668B1

(12) United States Patent
Kondratko et al.

(10) Patent No.: US 9,709,668 B1
(45) Date of Patent: Jul. 18, 2017

(54) RECONFIGURABLE PHOTONIC INTEGRATED CIRCUIT FOCAL PLANE ARRAY

(71) Applicant: Lockheed Martin Coherent Technologies, Inc., Louisville, CO (US)

(72) Inventors: Piotr Konrad Kondratko, Broomfield, CO (US); Philip Gatt, Berthoud, CO (US); John Glennon, Boulder, CO (US); Brian Carroll Redman, Lafayette, CO (US); Paul J. M. Suni, Berthoud, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 17 days.

(21) Appl. No.: 15/072,305

(22) Filed: Mar. 16, 2016

Related U.S. Application Data

(62) Division of application No. 14/166,713, filed on Jan. 28, 2014, now Pat. No. 9,316,534.

(51) Int. Cl.
*G01S 7/481* (2006.01)
*G01S 17/02* (2006.01)
(Continued)

(52) U.S. Cl.
CPC ............ *G01S 7/4811* (2013.01); *G01S 7/499* (2013.01); *G01S 17/02* (2013.01); *H04B 10/61* (2013.01); *H04B 10/63* (2013.01); *H04L 1/0042* (2013.01)

(58) Field of Classification Search
CPC ..... H04L 1/0042; H04L 1/0067; H04B 10/61; H04B 10/63; H04B 10/64; H04B 10/66; H04B 10/70
See application file for complete search history.

(56) References Cited

U.S. PATENT DOCUMENTS 5,510,927 A   4/1996  Noe
6,646,746 B1  11/2003 Sorin et al.
(Continued)

OTHER PUBLICATIONS

Taillaert, et al, "A Compact Two-Dimensional Grating Coupler Used as a Polarization Splitter," IEEE Photonics Technology Letters, Sep. 2003, pp. 1249-1251, vol. 15, No. 9.
(Continued)

*Primary Examiner* — Francis M Legasse, Jr.
(74) *Attorney, Agent, or Firm* — McDermott Will & Emery LLP

(57) ABSTRACT

A reconfigurable photonic integrated circuit focal plane array (RPIC-FPA) includes detectors and photonic integrated circuit coupled to the detectors that are configured to mix a return signal beam with local oscillator (LO) beams to produce a combined beam and direct the combined beam to the detectors. The LO beams have reconfigurable optical properties enabled by the RTIC-FPA. The LO beams are individually addressed to switch the detectors between a direct detection mode and various coherent detection modes based on adjustments to the optical properties of the LO beams. In the coherent detection mode, the controller is configured to mix the return signal beam with the LO beam having adjusted optical properties to produce the combined beam, and, in the direct detection mode, the controller is configured to disable the LO beams based on adjustments to the optical properties and to direct the return signal beam to the detectors without mixing.

6 Claims, 6 Drawing Sheets

(51) Int. Cl.
*G01S 7/499* (2006.01)
*H04B 10/63* (2013.01)
*H04L 1/00* (2006.01)
*H04B 10/61* (2013.01)

(56) References Cited

U.S. PATENT DOCUMENTS

| | | | |
|---|---|---|---|
| 7,027,743 B1 * | 4/2006 | Tucker | H04B 10/64 356/484 |
| 8,188,418 B1 | 5/2012 | Kondratko et al. | |
| 2009/0142076 A1 * | 6/2009 | Li | H04B 10/61 398/208 |

OTHER PUBLICATIONS

Doerr, et al. "Monolithic Polarization and Phase Diversity Coherent Receiver in Silicon," Journal of Lightwave Technology, Feb. 2010, pp. 520-525, vol. 28, No. 4.
Ma, et al. in "Shot Noise Suppression in Avalanche Photodiodes," Journal of Physical Review Letters, 2005, pp. 1-17, vol. 95, No. 17, 2005.

* cited by examiner

RECONFIGURABLE PHOTONIC INTEGRATED CIRCUIT FOCAL PLANE ARRAY

CROSS-REFERENCE TO RELATED APPLICATIONS

This application is a divisional of U.S. patent application Ser. No. 14/166,713, filed on Jan. 28, 2014, entitled "RECONFIGURABLE PHOTONIC INTEGRATED CIRCUIT FOCAL PLANE ARRAY," which is incorporated by reference herein in its entirety.

STATEMENT REGARDING FEDERALLY SPONSORED RESEARCH OR DEVELOPMENT

This invention was made with government support under Contract Number FA8650-11-C-7167 awarded by the United States Air Force. The government has certain rights in the invention.

TECHNICAL FIELD

The subject technology generally relates to active optical detection and, in particular, relates to receivers for coherent and direct optical detection.

BACKGROUND

Light detection and ranging (lidar) and laser detection and ranging (ladar) systems, hereafter collectively referred to as ladar systems, are remote sensing systems that send light from a transmitter to a target, detect light scattered from the target using a receiver, and infer properties about the target from the detected light. Inferred properties may include range, velocity, vibration, material, and other parameters. Generally these systems can be divided into two categories: direct detection ladar and coherent detection ladar, depending upon the method used for detection of the scattered light.

Direct detection systems are generally simpler to implement since the receiver only requires a detector that converts absorbed photons into electrical current and electronic components that amplify and filter the resulting electrical signal for further processing. Coherent detection systems are generally more complex to fabricate, in that the receiver must incorporate a local oscillator (LO) beam of light that is mixed with the received light to produce a signal proportional to the coherent addition of the LO electric field and the signal field.

Historically, one or the other type of detection has been designed into ladar system architectures, primarily as a result of a priori decisions about what parameters the system must detect. All parameters can in principle be detected with coherent detection, whereas direct detection systems cannot make measurements that require retrieval of the signal optical phase. Important cases that involve phase retrieval include Doppler measurements of speed, velocity, and vibrations. It has generally also been the case that coherent detection systems provide greater sensitivity than direct detection systems. Appropriately designed coherent detection systems can detect the reception of single photons, whereas many direct detection systems have noise that limits the detection sensitivity to far higher levels. In some applications, however, greater sensitivity can be achieved in direct detection systems. For example, in some cases, direct detection generally can achieve greater sensitivity than coherent detection when measuring relative intensity, like for differential absorption lidar (DIAL), because direct detection can more easily overcome the speckle noise floor, which is generally the limiting noise source in an intensity measurement.

Many ladar systems that operate in the field, for example, from aircraft, are severely limited in the amount of space they can occupy and the electrical power they can draw from the aircraft. In addition, operation with the greatest possible sensitivity is essential. Furthermore, operational scenarios in current and future systems place a high premium on transmitter and/or receiver multi-functionality, such that it is highly desirable for a single installed system to be capable of carrying out multiple measurements with high efficiency. This is particularly the case where size, weight, power, and cost (SWaPC) are at a premium, as is the case in land-based vehicles, aircraft, aircraft pods, UAVs (unmanned aerial vehicles), MAVs (micro air vehicles), and satellite payloads. This trend to improved SWaPC is anticipated to continue with a desire to increase the multi-functionality of the measurement systems. It is also highly desired for ladar systems to be immune to jamming and background noise. Since direct detection receivers are sensitive to any photons of the correct wavelength that are absorbed by the photo detector, they are relatively sensitive to interference. Coherent detection systems, on the other hand, are only sensitive to photons that, when mixed with the LO, produce a beat frequency within the RF bandwidth of the receiver, and in addition, are propagating in the same single spatial mode as signal photons. For this reason coherent detection systems are generally many orders of magnitude less sensitive to interference.

In one or more approaches, coherent and direct detection systems are a composite of discrete optical detector devices packaged into a common module. As such, a remote sensing receiver requiring multi-functional coherent and direct detection capability typically requires multiple optical detection paths with different types of detectors. The utilization of discrete optical detectors increases the complexity and engineering of the entire optical receiver system. Particularly, these discrete implementations result in increased SWaPC and suffer in pixel scaling complexity for associated receiver system.

SUMMARY

Embodiments of the subject technology provide a multi-function optical detection system switchable between various coherent detection modes and direct detection mode. The reconfigurable optical detection system may include an array of detectors coupled to an array of photonic injectors, which may be configured to mix a signal beam with a local oscillator beam to produce a combined beam and direct the combined beam to the detectors. The local oscillator beam may include optical properties associated with the direct and coherent detection modes. The detection system may also include a controller for the components of the reconfigurable photonic integrated coupled to photonic injectors, which may be configured to switch the sensing mode of the detectors between the direct detection mode and coherent detection modes based on adjustments to the optical properties of these components. In the coherent detection mode, the controller may adjust the optical properties of the individual or set of local oscillator beams associated with individual detectors or set of detectors. The individual photonic injectors may mix the signal beam with the local oscillator beam to produce the combined beam with the adjusted optical properties and may direct the combined beam to respective detectors. In the direct detection mode, the controller may be configured to disable the individual local oscillator beams based on one or more adjustments to the optical properties associated with this mode and the signal beam may be directed to respective detectors without mixing.

In some aspects, a method of reconfiguring optical detection system between a direct detection mode and a coherent detection mode having an array of photo detectors is provided. The method may include receiving a signal beam in either coherent or direct detection mode on aggregate or individual pixel basis. In the coherent detection mode, the method may include performing the steps of mixing the signal beam with a reconfigurable local oscillator beam to produce a combined beam. The method may also include selecting one or more of photo detectors on the array to receive this combined beam. The method may also include reconfiguring selected detector pixel to the direct detection mode, where the local oscillator beam may be disabled based on the adjustments to the optical properties of the reconfigurable photonic integrated circuit. The method may also include selecting one or more of the photo detectors on the array to receive the direct detection signal beam, where multiple local oscillator beams may be disabled based on the adjustments to the optical properties of the reconfigurable photonic integrated circuit. The method may include directing the signal beam without mixing to the selected detector or multiple detectors on the array.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

Figure 1:
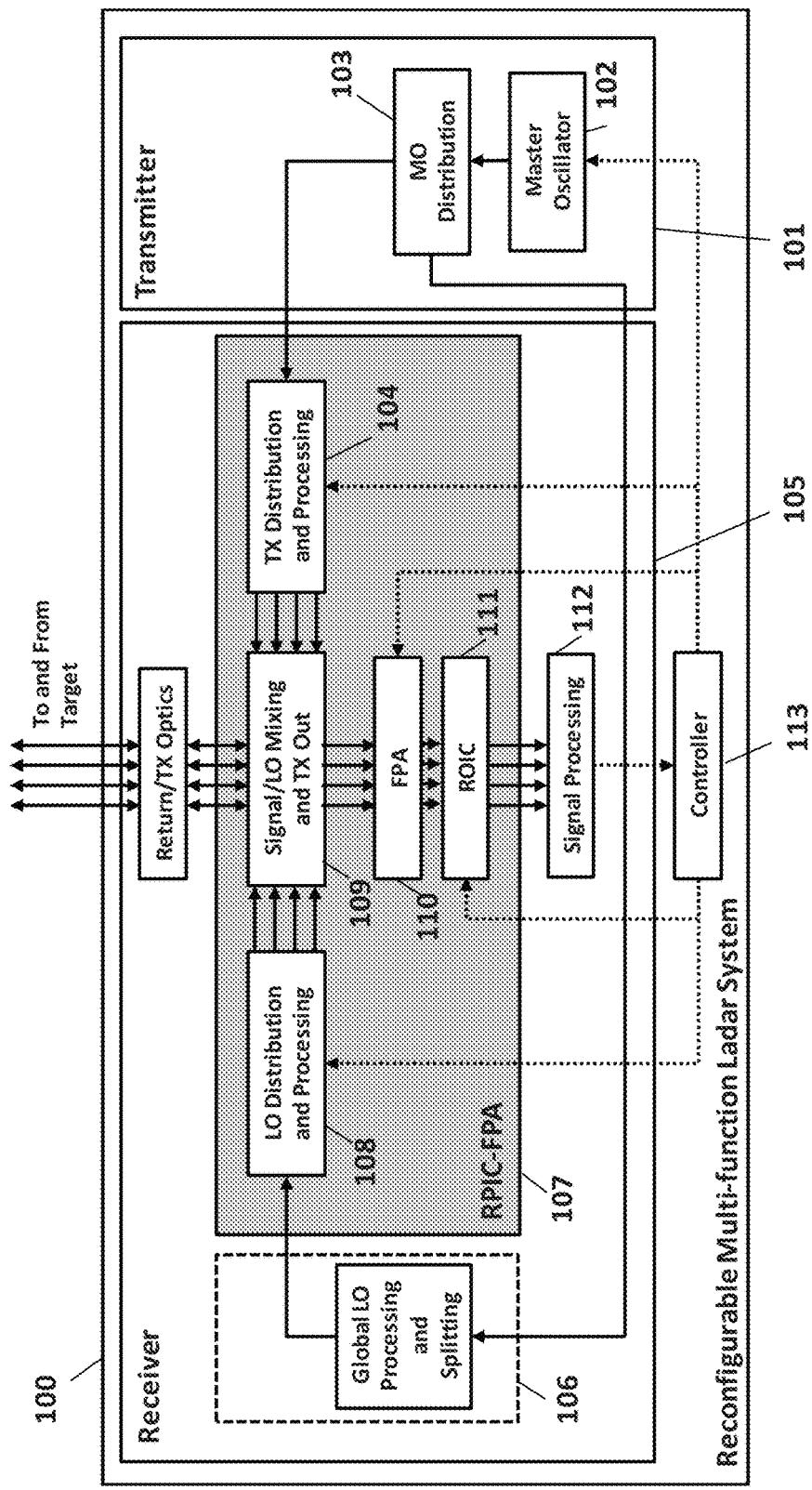
FIG. 1 illustrates a high-level system diagram for a multi-function ladar having a reconfigurable photonic integrated circuit focal plane array (RPIC-FPA) as part of a receiver system according to various aspects of the subject technology.

It is desirable to construct a ladar receiver system that can be reconfigured in real time between various coherent detection modes and direct detection mode. This way, the mode of detection does not have to be made prior to the system design, but in real time when the system is fielded. In addition, it is desirable for this system to reconfigure the various coherent modes and direct mode of operation on an individual pixel basis. As such, the receiver system is equipped to perform advanced and discriminating sensing functions on instantaneous fields of view. The reconfigurability can be realized by constructing a system comprising of multiple and separate receivers, in which each receiver is dedicated to one of the detection modes and an optical switch re-directs the signal beam to one of the multiple receivers based on the desired detection mode. The optical switch drastically increases in complexity if the receiver system desires to enable the instantaneous field-of-view sensor reconfiguration. A drawback with this approach is that it necessitates separate optical detection channels and a requirement that multiple receivers rather than one be aligned within the system.

A ladar receiver based on a focal plane array (FPA) format and capable of various functions with on-the-fly reconfiguration is desirable. The implementation that allows various modes of detection on pixel-by-pixel basis can substantially enhance sensing functionality with reduced complexity. These advantages are further exasperated by the fact that a compact multi-function receiver presents a significant savings to size, weight, power, and cost (SWaPC) to the overall system.

In this respect, the subject technology provides an integrated receiver approach wherein a single FPA can be configured to provide multiple coherent detection functions. The coherent FPA multi-functionality and reconfigurability can be enabled by the control of discrete LO on a pixel-by-pixel basis. As such, individual local oscillator function (via LO injectors) addresses each pixel on the FPA to the desired mode of operation supported by the local oscillator photonic circuitry. Additionally, the photonic circuit supports transmission of individually encoded transmitter light out of photonic components.

To illustrate the receiver concept using pixel-by-pixel reconfiguration, it is straightforward to consider the following scenario. At one instance, the selected number of detector pixels on the FPA can tune the signal-to-local oscillator offset frequency such that multiple velocity signatures for an extended target can be determined simultaneously. Once the target velocity is acquired and tracked, a selected number of receiver pixels can be reconfigured to perform coherent polarimetric sensing to allow detailed target classification using the polarization decomposition of the return signal field. At a later instance, all or particular LO functions can be turned off, to enable all or particular detector pixels on the FPA to reconfigure to direct detection mode. In this respect, long distance target range, rate, and 3D imaging functions can be enabled for particular detectors on the FPA. The subject technology provides a receiver capable of representative sensing scenario and functions. The receiver comprises of integrated platform wherein a photonic integrated circuit is coupled to a focal plane array of detector pixels. The technology offers a receiver capable of multiple sensing functions, on-the-fly reconfiguration, and pixel-by-pixel reconfiguration. Implementations of the subject technology provide a ladar receiver with multi-function real-time reconfigurable modes of operation with reduced system complexity, cost, size, weight, and power.

FIG. 1 illustrates a high-level system diagram for a multi-function ladar 100 having a reconfigurable photonic integrated circuit focal plane array (RPIC-FPA) as part of a receiver system according to various aspects of the subject technology. The subject technology provides for a ladar system 100 that is capable of reconfigurable receiver and transmitter functionality. The ladar system 100 comprises of transmitter 101, receiver 105, and controller 113. The transmitter 101 includes master oscillator 102 and master oscillator distribution 103 that couples the light to the receiver LO and transmitter optical paths. In some embodiments of the subject technology, the RPIC-FPA may comprise of transmitter distribution and processing module 104. This module, which may be part of the photonic integrated circuit of the RPIC-FPA 107, enables encoding of the output light using the combined signal/LO mixing and TX output module 109. As such, the transmitted beam can be encoded on individual pixel basis and steered by utilizing that particular component of the receiver RTIC-FPA. In some embodiments, the receiver 105 can include optional off-chip receiver components 106 that globally preprocess and split the LO optical path for input to the RPIC-FPA 107. The RPIC-FPA 107 includes LO distribution and processing module 108, signal/LO mixing and TX output module 109 (that can be optionally shared with the transmitter), focal plane array (FPA) 110, and read-out integrated circuit (ROIC) 111. The ROIC signal is coupled to signal processor 112 for data acquisition and processing purposes.

In operation, the master oscillator distribution module 103 may be configured to transmit light from the master oscillator 102. The transmitter distribution and processing module 104 may be configured to apply amplitude and phase modulation to the pulse, and/or amplify the pulse, and then transmit the pulse to a target via 109. In some configurations, the transmitter distribution and processing module 104 may be configured to apply chirp to the pulse. The same module (109) can simultaneously allow for monitor (also known as the reference) acquisition. Off-chip receiver 106 may be configured to split off a portion of an output from the master oscillator distribution module 103 for use as continuous wave LO beam global processor and splitter. Off-chip receiver 106 may contain fiber-coupled phase modulators, which can be used to globally tune the frequency of the LO beams. In addition, that module can be used to globally separate the LO beams into vertical and horizontal polarizations.

The LO beam or beams are then input through a fiber interface to RPIC-FPA 107. Once the LO beams are coupled into RPIC-FPA 107, the LO beams can be split, routed, and encoded via LO distribution and processing module 108. The encoding can include amplitude, phase, and frequency adjustments before input to signal/LO mixing module 109. In some aspects, the signal/LO mixing and TX out module 109 may be an array of two-dimensional (2D) photonic crystal grating couplers, as for example described by D. Taillaert, et al. in "*A Compact Two-Dimensional Grating Coupler Used as a Polarization Splitter*," IEEE Photonics Technology Letters, Vol. 15, No. 9, pp. 1249-1251, 2003, and C. R. Doerr, et al. in "*Monolithic Polarization and Phase Diversity Coherent Receiver in Silicon*," Journal of Lightwave Technology, Vol. 28, No. 4, pp. 520-525, 2010, both hereby incorporated by reference, or three-dimensional (3D) photonic crystal grating couplers, each comprising of a multi-input and multi-output ports for LO, TX, and return optical signals. As such, each individual photonic crystal grating can include multiple waveguides for particular LO and TX inputs while the grating serves to output the TX but also mix the signal return with LO input. In one or more implementations, the photonic crystal grating input/output coupler may be configured to operate as a multi-port polarization splitter and combiner device.

In one or more implementations, RPIC-FPA 107 provides orthogonal polarization encoding and injection schemes for LO signals (output from LO distribution and processing module 108) to enable pixel-based coherent heterodyne polarimetry. The LO signals are mixed with a return signal from the target using a single photonic crystal grating (in signal/LO mixing module 109) and are detected using high-speed and low noise avalanche photo-detectors (APDs) on the FPA 110. For each discrete pixel of the FPA 110, the architecture of RPIC-FPA 107 enables reconfigurable coherent modes wherein wavelength, polarization, and phase can be adjusted independently. In addition, the architecture provides each detector pixel the capability to be switched to direct detection mode of operation. The multi-functionality offers advanced receiver sensing capabilities with on-the-fly reconfiguration, while allowing for reduced complexity, cost, and size of receiver.

Following detection of the mixed signal by FPA 110, the resulting electrical output signal of FPA 110 is input to the ROTC 111. ROIC 111 may include an amplifier that can amplify the resulting electrical output signal in one of two amplification modes controlled by controller 113 via a control signal. One amplification mode may be optimized for coherent detection and the other for direct detection. Thus, the amplifier can be set (or programmed) by the control signal to operate optimally for either coherent or direct detection, as for example described by U.S. patent application Ser. No. 12/707,633, filed Feb. 17, 2010, issued as U.S. Pat. No. 8,188,418 on May 29, 2012, hereby incorporated by reference. ROIC 111 can output an amplified signal for further conditioning or processing by signal processing module 112.

In some aspects, the architecture of RPIC-FPA 107 provides for reconfigurable mode of operation by means of switching and/or tuning individual or group of detector pixels in FPA 110 using the LO photonic distribution and processing module 108 that is coupled to the FPA 110 through the signal/LO mixing and TX out module 109. The LO distribution and processing module 108 supports amplitude, phase, and frequency functions for the polarization state of the particular LO that addresses a specific detector pixel on the FPA 110. This implementation allows for reconfiguration of mode for individual detector pixel. In addition, the amplitude reconfiguration that is supported by the LO photonic distribution and processing module 108 enables the switching of certain detector pixel from the multitude of coherent modes to direct detection mode. This function is achieved by complete extinction of particular LO light that address the pixel or group of pixels on the FPA. In some aspects, one or more of the detectors can be configured to operate in the direct detection mode when an optical switch decreases an amplitude of a local oscillator beam to extinction.

In various aspects, the detectors on the FPA 110 may be implemented with avalanche photo-detectors (APDs) or Geiger-mode avalanche photo-detectors (GrnAPDs). The APDs may include a material choice and/or purposely designed structures to exhibit ultra-low excess noise values under both modes of operation (e.g., coherent detection and direct detection). In some aspects, the APDs are composed of mercury cadmium telluride (NWT). In such architecture the FPA detector array switches between coherent and direct single photon sensitive mode with the LO field and/or control of detector bias. The method of LO switching from direct photon detection to coherent modes takes advantage of implicit APD saturation, wherein the gain is significantly reduced by the LO field that impinges the detector.

In some aspects, high-speed high-dynamic range photonic phase and/or frequency shifters may be coupled to a controller, such as controller 113, and a photonic integrated subsystem that includes, for example, signal/LO mixing module 109. In some aspects, high-speed high-dynamic range photonic phase and/or frequency shifters may be part of the LO distribution and processing module 108 to vary an offset frequency between the LO signal and the return signal, in which selected detectors on the FPA 110 are configured to detect light in the coherent detection mode at the particular offset frequency.

Finally, the LO reconfiguration includes spatial LO phase reconfiguration for particular polarization state of the LO light beam. This functionality enables various LO phase maps to be projected spatially across FPA 110, and is envisioned for applications demanding coherent apertureless imaging and digital holography. The embodiment enables reconfigurable functions for real-time selection of spatial and temporal mode of operation for the FPA 110 implemented as a multi-pixel detector array. In some aspects, phase shifters (e.g., integrated phase shifters) can be coupled to a controller, such as controller 113, and can be configured to vary a phase of the LO light beam at individual polarizations for each of the plurality of detectors. The detectors that are in spatial proximity to one another can be configured to detect the combined beam at various phases of the LO light beam.

Figure 2:
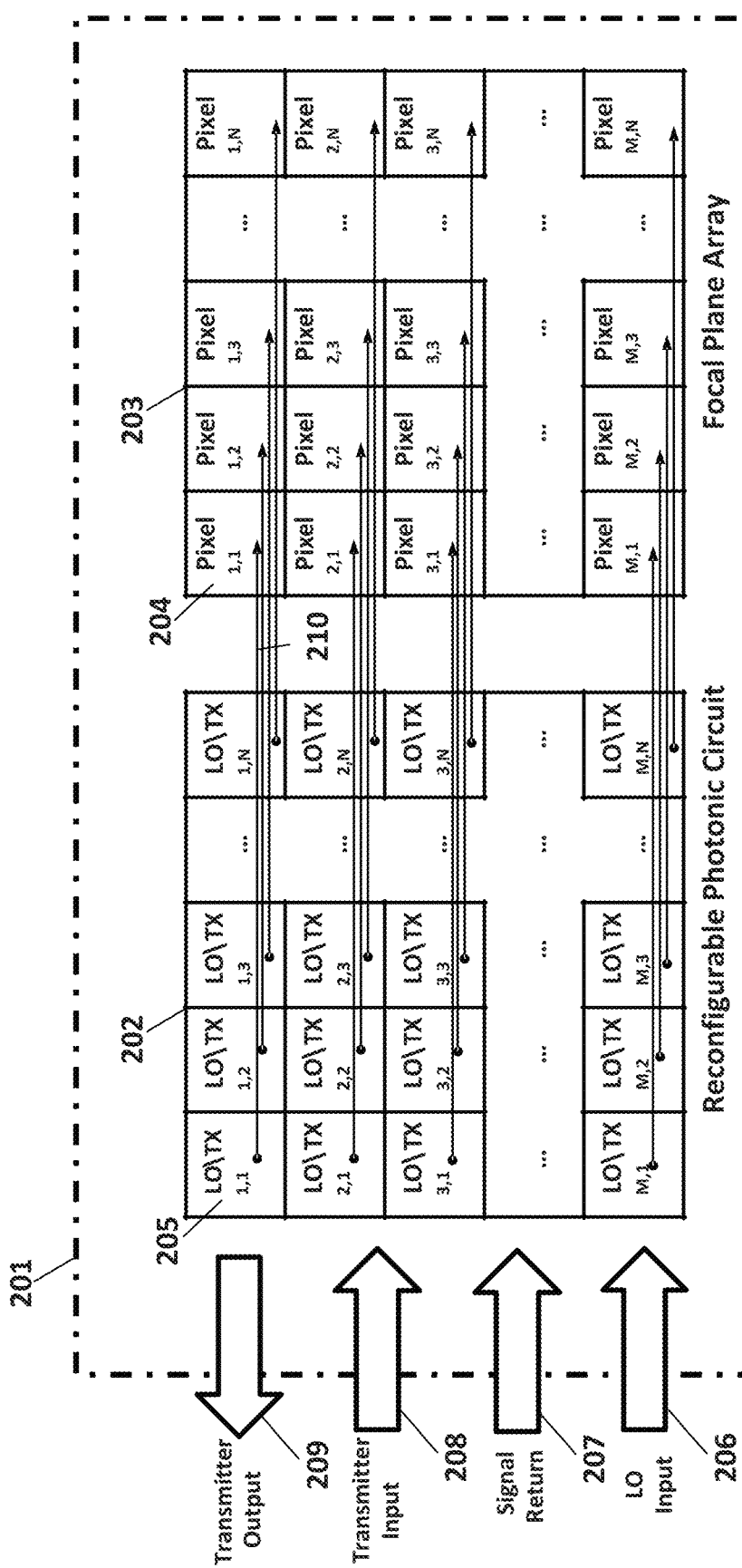
FIG. 2 is a block diagram illustrating pixel-by-pixel reconfigurable optical detection and transmitter system according to various aspects of the subject technology.

FIG. 2 is a block diagram illustrating a multi-pixel interconnection between the individual photonic circuit components of the LO distribution and processing module 108, signal/LO mixing module 109, and FPA 110 according to various aspects of the subject technology. Reconfigurable photonic integrated circuit focal plane array includes the multi-pixel receiver 201 composed of reconfigurable photonic integrated circuit 202 with individual photonic injector elements 205 and focal plane array 203 with individual pixel detectors 204. This system is input with LO light 206 originating from the master oscillator (e.g., 102 in FIG. 1). In addition, the reconfigurable photonic circuit 202 accepts the signal return input 207 and transmitter input 208 and may be configured to also output the transmitter light to target 209. In some aspects, reconfigurable photonic circuit 202 is an array composed of photonic injectors that are operable to receive various LO and transmitter signals at different times or simultaneously. The focal plane array 203 comprises an array of APD or GmAPD detectors that are spatially coupled to the photonic circuit 202.

The multi-pixel focal plane array 203 coupled to reconfigurable photonic circuit 202 offers pixel-by-pixel switchable coherent and direct detection modes of operation. As shown in FIG. 2, the receiver system 201 includes reconfigurable photonic circuit 202 illustrated as an M×N array, and coupled to focal plane array 203 illustrated as an equivalent M×N array. In this implementation, each and every detector on focal plane array 203 (e.g., detector 204) can be individually addressed by a corresponding photonic injector (e.g., photonic injector 205). By way of illustration, photonic injector 205 having coordinate location (1,1) is configured to supply LO, mix return, and transmit light to corresponding detector 204 having coordinate location (1,1) on focal plane array 203. Similarly, photonic injector at coordinate location (M,N) can supply light to a corresponding detector at coordinate location (M,N) of the focal plane array 203. In an alternate configuration (not illustrated by FIG. 2), a single photonic injector 205 could address multiple pixels of the focal-plane array 203. In some configurations, multiple LO signals can be supplied to a pixel of the focal-plane array 203, which can allow, for example, simultaneous polarization measurements at the same pixel. In some aspects, each of LO injectors is configured to individually transmit the combined beam to the respective ones of the detectors.

In some implementations, the reconfigurable photonic circuit focal plane array 201 can simultaneously act as a mono-static phased array transmitter and receiver system. The reconfigurable photonic circuit 202 is supplied by LO input 206, which is further encoded and distributed (by module 108) as individual local oscillators for particular pixel on the focal plane array 203. In addition, the reconfigurable photonic circuit 202 can receive and mix signal return input 207 with individual LO signals. Furthermore, the transmitted light 209, that, in similarity to the LO distribution case of above, is output from the photonic integrated subsystem using the individual photonic injectors. In this implementation, the reconfigurable photonic circuit 202 encodes the transmitter input 208 (using the TX distribution and processing module 104) and subsequently transmits that input to the target using individual photonic injection elements through output 209. As such, the preferred embodiment of RPIC-FPA as illustrated by FIG. 2 provides for reconfigurable, multi-function, and multi-pixel transmitter and receiver subsystem.

To illustrate the pixel-by-pixel addressability of the RPIC-FPA, the individual local oscillator beam 210 is configured to tailor the operating mode of detector 204 on the focal plane array 203. To enable the direct detection mode for this selected pixel on the focal plane array 203, the local oscillator amplitude is turned off. However, for coherent mode, the local oscillator amplitude is turned on, and various coherent modes of operation are enabled by reconfiguration of the frequency, polarization, and phase of the LO input 206. In the coherent mode, the photonic components and injector elements included in reconfigurable photonic circuit 202 are capable of encoding the specific LO input 210 in amplitude, frequency, polarization, and phase. The input 210 is individually distributed and injected into the selected pixel (204) or set of pixels on the focal plane array 203. In addition, the reconfigurable photonic circuit 202 is capable of injecting LO input 206 to each pixel with orthogonal polarizations, enabling individual detectors to perform previously mentioned coherent polarimetric sensing. In some aspects, each detector of focal plane array 203 can be configured independently from the other detectors. In some aspects, detectors of focal plane array 203 in spatial proximity to one another can share functionality with an individual local oscillator injector of reconfigurable photonic circuit 202 when a number of local oscillator injectors in reconfigurable photonic circuit 202 is less than a number of detectors included in focal plane array 203. As such, the reconfigurable photonic circuit 202 provides local oscillator distribution and encoding capability for each and every pixel.

The focal plane array 203 is composed of APDs or GmAPDs capable of gains of less than ~1000 for coherent mode of operation, whereas the gain for direct detection mode exceeds the ~1,000 to ~100,000 ranges. In coherent mode, the actual detector gain values can be driven by post-amplifier noise and input local oscillator optical power to the APDs, and can be chosen such that receiver 201 operates in shot-noise limited regime. Moreover, to achieve high system efficiency the APD utilized in a coherent detection mode requires near noiseless amplification. Any significant statistical variation in the gain of an APD, sometimes referred to as an excess noise figure, has a direct detrimental impact on coherent receiver system efficiency. By switching the local oscillator amplitude off, the same avalanche photo-detector is capable of operating in linear or Geiger photon mode to enable direct detection operation with single-photon sensitivity. This mode of operation typically requires gains greater than ~1000 within the APD pixel, and similar to coherent case above, this gain requirement is driven again by the post-amplifier noise.

Figure 3:
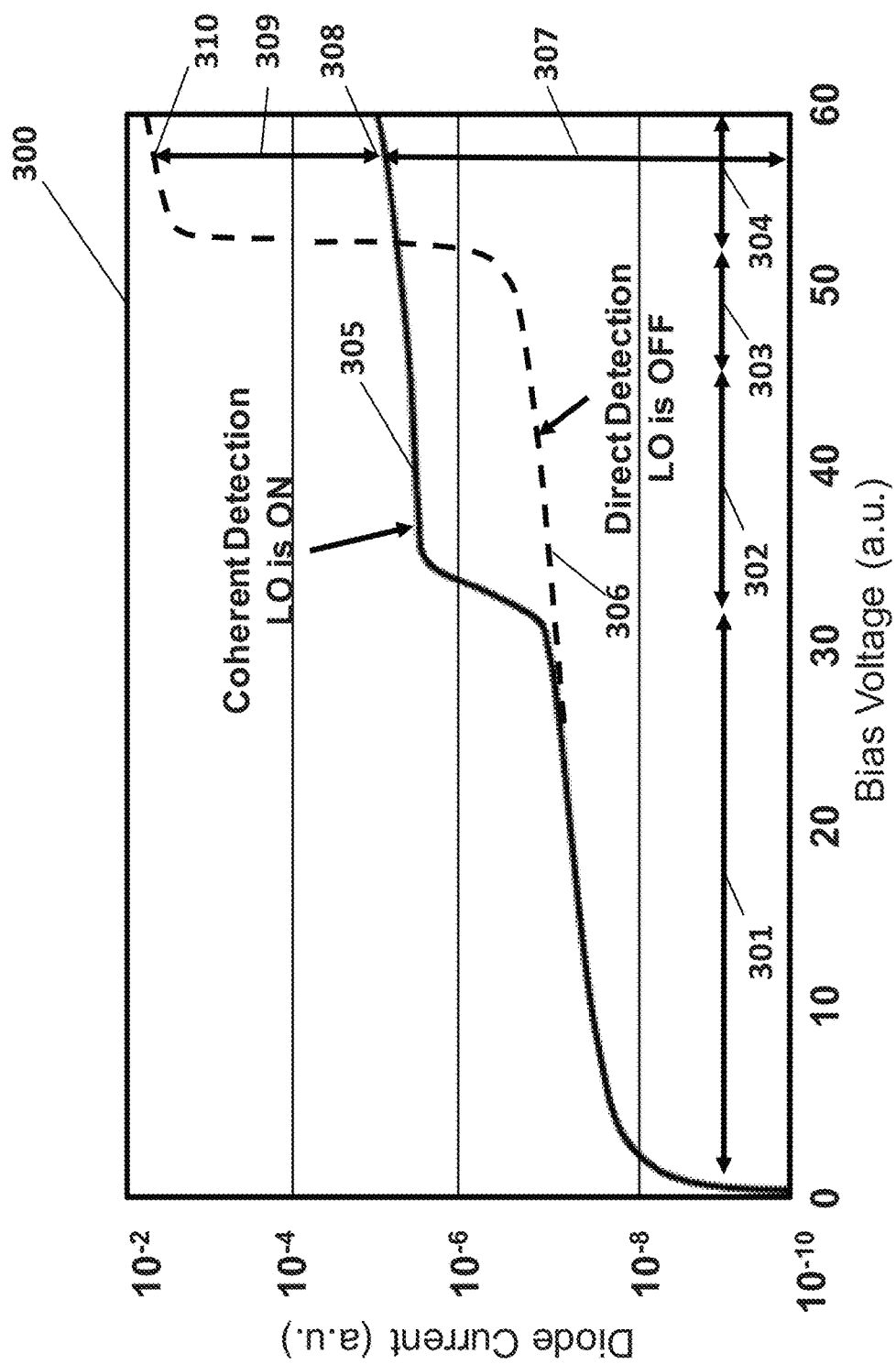
FIG. 3 is a plot illustrating various operating regimes of an avalanche photo detector pixel according to various aspects of the subject technology.

FIG. 3 is a plot 300 illustrating various operating regimes of an avalanche photo detector pixel according to various aspects of the subject technology. The plot 300 is a representation of current versus bias where the switching between the coherent and direct detection modes is achieved using LO and detector bias control. For coherent modes of detection, the detector pixel is switched (or saturated) to low gain operation. For direct detection the detector pixel is not illuminated by the LO (or is un-saturated) yielding high-gain for single-photon sensitive mode of operation.

In one or more implementations, a focal plane array includes an array of APIs or GmAPDs capable of bias- and optically-dependent switching between the coherent and direct detection modes of operation. In this respect, each of the avalanche photo detectors can include a photo diode configured to be reverse-biased at one voltage and illuminated with LO for low gain operation (coherent detection mode) and reverse-biased at a slightly different voltage for high gain operation (direct detection mode). An understanding of the operation of an APD and the role of excess noise in ladar systems is particularly important, since it affects the overall system efficiency. An APD can be characterized by its current vs. bias (I-V) curve, which indicates how much current the APD draws and how much gain the APD produces as a function of the reverse bias applied to the APD.

A typical I-V behavior can be characterized by several regimes of operations. FIG. 3 shows the current vs. voltage characteristics for the two desired modes of operation. In some aspects, the coherent detection mode is enabled optically by local oscillators (LOs) being switched on. At low bias levels indicated by regime 301, the APD is essentially in the "off" state, wherein it has limited response to illumination. At higher bias indicated by regime 302, the APD operates as a conventional near-unity gain photo detector. Under illuminated conditions (solid curve), the APD produces a higher current than the un-illuminated (dashed curve) state. As the bias is raised further, the device enters regime 303 where it produces linear avalanche gain, i.e. for each absorbed photon that produces a primary photo-electron the device outputs M electrons, where M is the gain at the particular bias. In regime 303, the gain may vary from, for example, less than 10 to greater than 1,000, and may be tailored by the amount of optical illumination impinging the detector. Further increases in the reverse bias rapidly increases the gain into the so-called Geiger regime 304 where the gain may reach, for example, from 10,000 to >100,000.

In some aspects of current embodiment, a detector (e.g., APD or GmAPD) operating at two not-drastically distinct bias levels for the different detection modes can be provided. In this respect, the particular avalanche photo detector pixels on the FPA are configured to perform a low gain function for the coherent detection mode, indicated by I-V curve 305, when the local oscillator beam is on and a high gain function, indicated by I-V curve 306, for the direct detection mode when the local oscillator beam is off. The APDs are configured to operate in a Geiger bias regime 307 for both modes of operation, wherein the LO is responsible for tailoring the gain required. The diode response in coherent mode (LO is on) indicated by solid curve 305 shows a reduced gain at 308. At this bias, the APD still has sufficient gain (in the ~10-100) to take advantage of the reduced LO power requirement when considering multi-pixel receiver implementations. When the LO is turned off, the diode switches to high-gain regime 309 for single photon sensing at 310, which enables direct detection mode. In some aspects, the APD can be configured to perform a low gain operation for the coherent detection mode when the LO beam is on and a high gain operation for the direct detection mode when the LO beam is off. In some aspects, the APD can be configured to operate in a Geiger regime for the high gain operation. In some aspects, the APD or Geiger-mode APD can be configured to operate in a saturated avalanche gain regime for the low gain operation.

Higher performance detectors can be achieved by meeting two conditions. First, the detector material choice, stoichiometry, and structure are important. Second, the detector operating modes between which switching is performed is important to the receiver system implementation. In various aspects, the LO is the primary tailor for the amount of detector gain while the detector bias fine-tunes the desired level of gain and excess noise for particular coherent mode of operation. A major consideration in choosing the detector material is the excess noise of the detector. Most detector materials are ill suited for coherent detection when operated as APDs because of the excess noise contribution to system efficiency. However, recent advances in material stoichiometry and, in particular, the detector structure show reduced excess noise performance of the APDs, as for example described by F. Ma, et al, in "*Shot Noise Suppression in Avalanche Photodiodes*," Journal of Physical Review Letters, Vol. 95, No. 17, 2005, hereby incorporated by reference.

Figure 4:
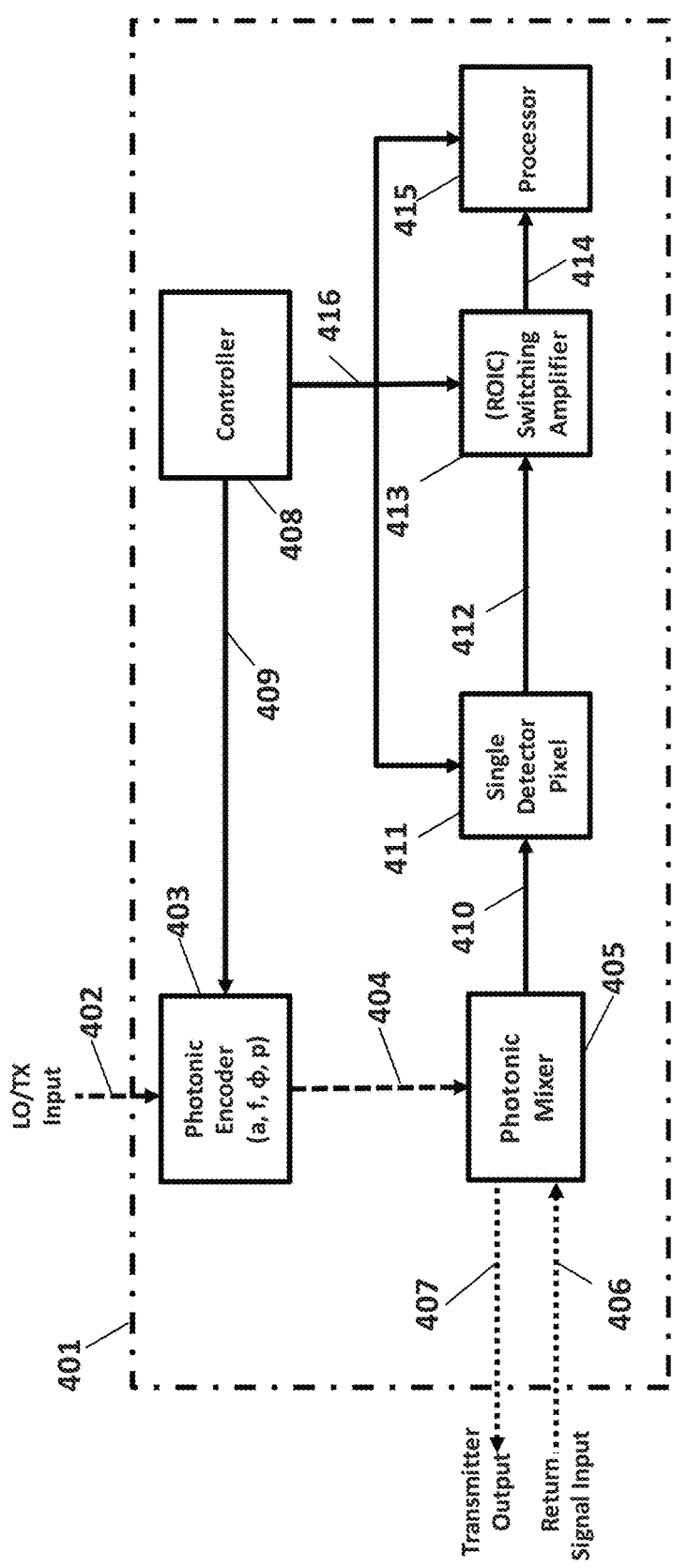
FIG. 4 is a block diagram illustrating a single path of reconfigurable optical detection and transmitter system according to various aspects of the subject technology.

FIG. 4 is a block diagram illustrating a single path function of reconfigurable photonic integrated circuit focal plane array system according to various aspects of the subject technology. Reconfigurable optical detection system 401 includes combined LO and TX input 402, photonic encoder 403, photonic mixer 405, controller 408, detector pixel 411, switching amplifier 413, and processor 415. The components and/or modules as shown in FIG. 4 can vary in number depending on implementation, and are not intended to limit the scope of the subject technology.

The reconfigurable functionality for each injection element 205 (FIG. 2) on reconfigurable photonic circuit 202 is described by reconfigurable optical detection system 401 of FIG. 4. First, the local oscillator beam and transmitter inputs are divided amongst the total number of discrete injection elements such that LO/TX input 402 corresponds to one such split and is an input to an individual photonic encoder 403 configured to adjust optical properties of the local oscillator beam including, but not limited to, amplitude "a," frequency "f," and phase "φ," for a particular polarization "p." Again, each detector pixel is then addressed by individual local oscillators/transmitters and the built in functions allow to equalize the amplitude with "a," tune the frequency offset with "f," change the phase with "φ," for orthogonal polarization "p." For example, photonic encoder 403 in the path of the local oscillator and/or transmitter light via LO/TX input 402 can be composed of a phase insensitive absorption modulator that enables the amplitude equalization and on/off switching. In one or more implementations, controller 408 is configured to select one or more optical properties of the local oscillator beam independently. In some aspects, controller 408 is configured to adjust one or more optical properties of the local oscillator beam independently. The controller 408 can provide, via signal 409, the selected optical properties to the photonic encoder 403.

In operation, the optical return signal input 406 enters the individual photonic mixer 405 and combines with individually encoded LO 404. The return signal 406 may be the return light scattered from a target illuminated by the transmitted signal 407 that originated in the photonic mixer. Depending on whether coherent or direct detection mode is selected, the local oscillator beam via LO/TX input 402 is either optically mixed with signal return input 406 or not. When switched to the coherent detection mode by controller 408, photonic mixer 405 optically mixes the encoded LO 404 with return signal input 406 to produce combined beam 410, which is injected to particular detector pixel 411. When switched to the direct detection mode, photonic mixer 405 passes return signal input 406 to single detector pixel 411 without mixing. Consequently, the beam 410 may or may not incorporate a local oscillator contribution, depending on the selected detection mode of the controller 408.

In some aspects, photonic mixer 405 is capable of receiving the horizontally and vertically polarized local oscillator beams independently along a second axis orthogonal to the signal return and transmitter axis. As such, each of photonic mixers 405 is configured to transmit the horizontally and vertically polarized LOs independently. In some aspects, each of LO injectors is configured to transmit the horizontally and vertically polarized local oscillator beams simultaneously. In this respect, detectors in focal plane array 203 (FIG. 2) are configured to be selected by particular photonic mixers, in which selected detectors are configured to detect the combined beam having a vertical, horizontal or combined vertical and horizontal polarization based on adjustments to the amplitude and frequency of the local oscillator beam.

In some aspects, photonic encoder 403 includes a high-speed phase modulator with serrodyne RF drive (not shown) to enable frequency tuning of the LO and TX input 402. Finally, this implementation can include a low speed phase shifter (not shown) to enable variable phase for each polarization impinging particular detector pixel 411. In this respect, multiple detectors of focal plane array 203 (FIG. 2) in spatial proximity to one another can be configured to detect combined beam 410 at various phases of the local oscillator beam. This enables the receiver to perform reconfigurable spatial coherent phased array imaging modes of operation. In some aspects, integrated phase shifters can be coupled to the controller 408 and the photonic mixer 405, where the integrated phase shifters are configured to vary a phase of the local oscillator beam at individual polarizations for each of the plurality of detectors. The detectors that are in spatial proximity to one another can be configured to detect the combined beam at various phases of the local oscillator beam. The output of photonic encoder 403 (e.g., encoded light beams 404 having adjusted optical properties for LO and TX) is then input to photonic mixer 405 that combines orthogonal polarizations of the LO and TX input 402 and mixes that light with return signal input 406 onto individual or group of detector pixels 411 on focal plane array 203 (FIG. Photonic mixer 405 functions as a multi-port polarization diverse combiner and splitter. In preferred embodiment, it can comprise of a six-way coupler configured to transmit two orthogonal polarizations of individually encoded TX beam 404 to 407, and comprise two additional orthogonal polarizations of encoded LOs 404 to be mixed with return signal input 406.

Following detection of combined beam 410 by single detector pixel 411, the resulting electrical output signal 412 of single detector pixel 411 is input to switchable amplifier 413 residing on the ROIC 111 (FIG. 1). The mode of switchable amplifier 413 and detector 411 is selected by 416 from the controller 408. One amplification mode may be optimized for coherent detection and the other for direct detection. Thus, switchable amplifier 413 and detector 411 can be set by the control signal 416 to operate optimally for either coherent or direct detection. The switchable amplifier 413 outputs an amplified signal 414 for signal processing by the processor 415.

Figures 5A, 5B:
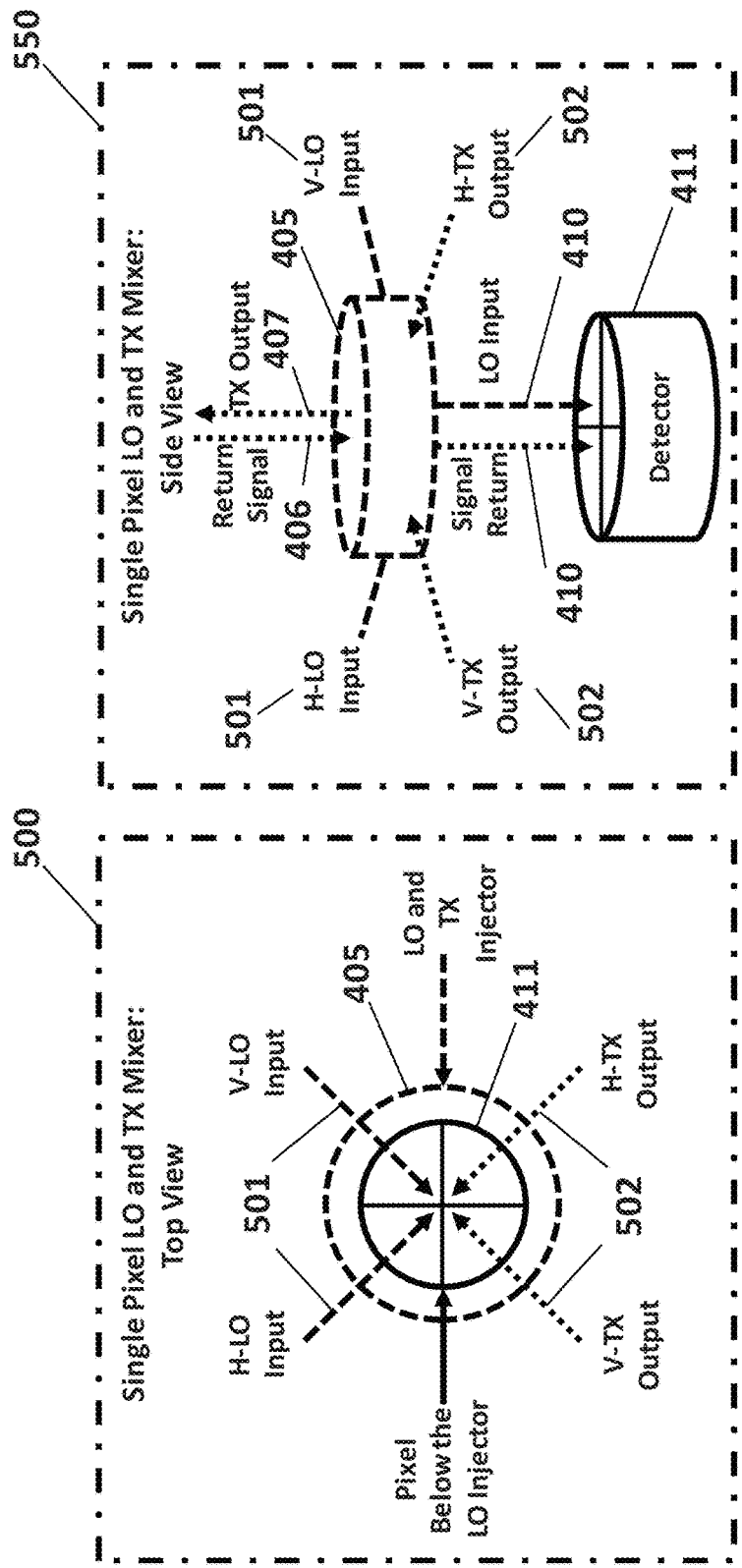
FIGS. 5A-5B illustrate top and side views of a photonic mixer and a detector pixel of the reconfigurable optical detection and transmitter system illustrated in FIG. 4 according to various aspects of the subject technology.

FIGS. 5A-5B illustrate top and side views of a photonic mixer 405 and a single detector pixel 411 of the reconfigurable optical detection and transmitter system illustrated in FIG. 4 according to various aspects of the subject technology. The configuration in FIGS. 5A and 5B includes two polarities (V and H) for the LO and transmitted light, which are injected, redirected, and mixed simultaneously within the photonic mixer 405.

Referring to FIG. 5A, the photonic mixer implementation 500 shows the photonic mixer 405 spatially coupled to a single detector pixel 411. The photonic mixer 405 is configured to receive a signal return input along axis 406 (in FIG. 5B). The implementation can also be configured to transmit the encoded TX beams 502 along the same axis 407 (in FIG. 5B). As such, photonic mixer 405 is configured to receive a horizontally polarized (e.g., H-LO input) and vertically polarized (e.g., V-LO input) local oscillator beams 501 orthogonal to one another as well as horizontally polarized (H-TX output) and vertically polarized (V-TX output) orthogonal transmitter beams 502 in the same plane of the mixer component.

In one or more implementations, photonic mixer 405 may include a photonic grating mixer configured to inject the two orthogonal local oscillator beams 501, mix the return signal beam 406 with the LO beams, and transmit two orthogonal TX outputs 502 to 407. The photonic grating mixer may represent a grating coupler that is a 2D or 3D photonic crystal device written or etched in a particular material system (e.g., silicon-on-insulator (SOI) waveguide). In some aspects, two orthogonal polarizations of the local oscillator beam (e.g., H-LO input, V-LO input) and two orthogonal polarizations of the transmitter beam (e.g., H-TX output, V-TX output) can be injected into the photonic grating mixer simultaneously or separately.

Referring to FIG. 5B, the photonic mixer implementation 550 shows a cross-section view of photonic mixer 405 and how that component couples the beams 501 and 502 into a single detector pixel 411. The return signal is input into photonic mixer 405 and mixed with two orthogonal polarizations of the local oscillator beam (e.g., H-LO input, V-LO input). The mixed beam 410 (e.g., signal return and LO input) is input to individual detector (e.g., detector pixel 411) or a group of detectors on the focal plane array 203 (FIG. 2). The orthogonal polarizations of the transmitter output beams 502 (e.g., V-TX output; H-TX output) are simultaneously or separately injected into the photonic mixer 405 and are output as a combined TX output beam 407.

To better describe the mixing component 405 of FIGS. 4, 5A, and 5B, it is straightforward to consider the signal produced on the detector 411. In coherent detection mode, the photonic mixer 405 produces a temporal signal on the detector 411 that corresponds to the frequency difference between the LO beam and the return signal. When considering two orthogonal polarizations, the optical power detected by the single detector pixel 411 is proportional to $$P_{(H,V)} = P_{S(H,V)} + P_{LO(H,V)} + \sqrt{P_{S(H,V)}}\sqrt{P_{LO(H,V)}} \sin[(\omega_{LO(H,V)} - \omega_{S(H,V)})t - \theta_{(H,V)}(t)] \quad (1)$$

where $P_{S(H,V)}$ and $P_{LO(H,V)}$, $\omega_{S(H,V)}$, and $\omega_{LO(H,V)}$ are signal and LO powers and angular frequencies, respectively. The term $\theta_{(H,V)}(t)$ corresponds to the temporal phase difference between LO beam and return signal. The (H, V) subscripts in Eq. (1) define the choice of either the horizontal (H) or the vertical (V) state of polarization of the return signal mixed with equivalent polarization of the LO field. The expression indicates that a single detector pixel 411 can be simultaneously used to detect two orthogonal polarization states. Generally, the return field Stokes parameters can be fully determined from the phase difference of the two polarization components, $\theta_{(H)}$ and $\theta_{(V)}$. The caveat of this detection method on a single detector is degraded signal-to-noise-ratio (SNR) that result from competing shot-noise between orthogonal polarization LOs. The consecutive mode of polarization discrimination can be achieved when the LO polarization to single detector pixel 411 is switched in time, (e.g., $P_{LO(H)}$ is followed by $P_{LO(V)}$). In this case only one LO of particular polarization state is impinging on a particular detector pixel 411 at a certain time. In some aspects, the subject technology allows for reconfigurable independent or simultaneous coherent polarization decomposition of the return signal and can describe complete or partial polarization state of the return signal field.

Figure 6:
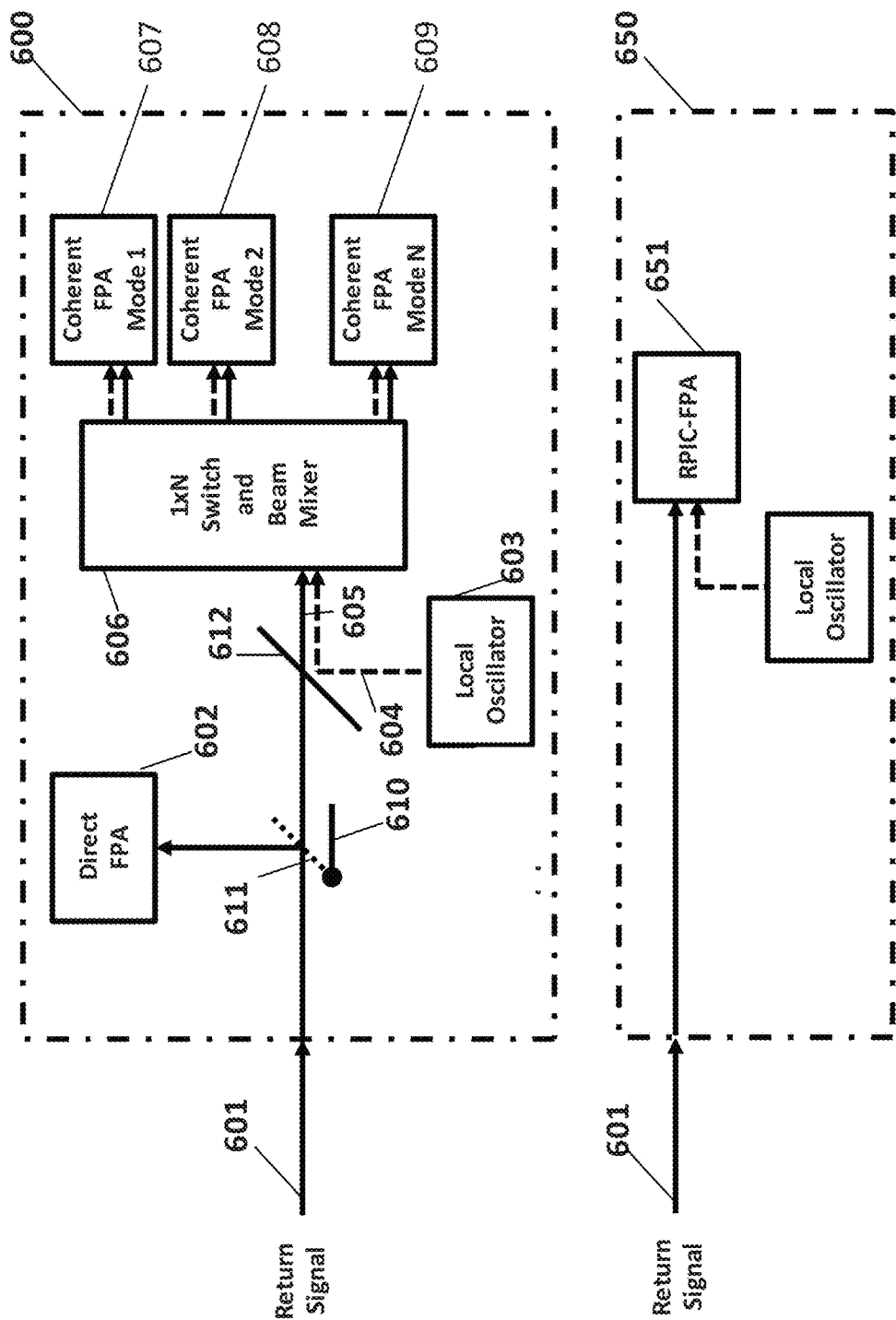
FIG. 6 is a block diagram illustrating a comparison between a conventional optical receiver system and a receiver system with the RPIC-FPA according to various aspects of the subject technology.

The advantage of the subject technology takes origin in the fact that one receiver component offers multiple sensing functions as opposed to multiple receivers providing a singular function. FIG. 6 serves as comparison between the multi-function and reconfigurable system implemented according to the RPIC-FPA 650 and a prior art approach implemented according to the conventional optical receiver system 600. The conventional optical receiver system 600 suffers from the need of multiple coherent and direct detection FPAs depending on desired system functionality and reconfiguration. As such, the multi-function and reconfigurable receiver system with the RPIC-FPA 650 is advantageous in that it allows rapid choice of available mode of detection, allows pixel-by-pixel reconfiguration, and reduces overall system complexity. In addition, the embedded multi-functionality using a single FPA has significant impact on the optical detection receiver size, weight, power, and cost (SWaPC).

In the prior art approach, the return optical signal 601 enters each individual optical receiver 600 and 650. In optical receiver 600, the optical signal 601 is switched between the coherent and direct functions by the switching element 610. The switching element 610 may be a mechanical mirror or a polarization-based switch that can be controlled to either direct optical signal 601 toward beam mixer network 606 via beam splitter 612 or direct the optical signal toward direct detection focal plane array 602 when switching element 610 is configured in the alternative position illustrated by dashed line 611.

In order for the coherent path to operate properly, it is also necessary to provide a local oscillator beam illustrated by dashed line 604 from local oscillator laser 603. For coherent detection, local oscillator beam 604 is mixed with optical signal 601 at beam splitter 612 to form a mixed beam 605 that is input to beam mixer network 606, and ultimately to coherent focal plane arrays 607, 608, and 609. Beam mixer network 606 can select between coherent focal plane arrays 607, 608, and 609 having respective detector channels. In this respect, coherent focal plane array 607 illustrated as mode 1 can be selected independent of coherent focal plane array 608 illustrated as mode 2, and coherent focal plane array 609 illustrated as mode N, where N is a positive integer representing various coherent modes desired.

Optical receiver 600 shown in FIG. 6 has drawbacks in practical situations. The multiple detectors add cost, weight, and power consumption to the receiver. This is a significant drawback since optical receiver 600 necessitates separate and multiple receivers, with the number of receivers equaling the number of desired modes of operation. Also, the required switching of optical signal 601 and local oscillator beam 604 to the particular coherent focal plane array adds to the receiver complexity, weight, cost, and power. Furthermore, alignment is critically important in ladar systems and the need for multiple detectors adds to the receiver complexity by requiring that multiple detectors be carefully aligned rather than one detector. The complexity of prior art receiver implementation 600 is further exasperated if the system is to employ on-the-fly pixel-by-pixel reconfiguration function. This functionality, which is supported by the RPIC-FPA 650, requires a complex switching mechanism under the prior-art approach selectively redirect the return and/or mixed signal to particular function FPA. Finally, depending upon the choice of detector type and material, the direct detector may have to be operated at cryogenic temperatures, which is frequently a significant drawback for practical applications.

Accordingly, it is desirable for a receiver to comprise of one focal plane array that can be electrically and/or optically reconfigured between multiple detection modes in real time. In this respect, using a single focal plane array has a significant impact on the optical detection receiver complexity, size, weight, power, and cost (SWaPC). As is shown in FIG. 6, a significant complexity reduction is shown by contrast of the conventional optical receiver system 600 to the implementation shown in the RPIC-FPA 650. This equivalent system is composed of RPIC-FPA embodiment and only requires a single focal plane array equipped with reconfigurable photonic circuit focal plane array 651. This single component replaces the various components of optical receiver 600 for direct and multiple coherent modes of operation. In addition, the RPIC-FPA 650 offers additional functions like pixel-by-pixel reconfiguration and integrated spatial modalities for TX and RX coherent beam forming and imaging.

Those of skill in the art would appreciate that the various illustrative blocks, modules, elements, components, methods, and algorithms described herein may be implemented as electronic hardware, computer software, or combinations of both. For example, the controller 408 may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of switching a reconfigurable optical detection and transmitter system comprising a photo detector between a direct detection mode and multiple coherent detection modes, the method comprising:
   receiving a signal beam;
   in a coherent detection mode of the multiple coherent detection modes, performing the steps of
      mixing the signal beam with a local oscillator beam to produce a combined beam;
      selecting the photo detector to receive the combined beam; and
      directing the combined beam to the photo detector; and
   in the direct detection mode, performing the steps of
      adjusting one or more optical properties of the local oscillator beam;
      disabling the local oscillator beam based on the adjustments to the optical properties;
      selecting the photo detector to receive the signal beam; and
      directing the signal beam without mixing to the photo detector.

2. A method of switching a reconfigurable optical detection and transmitter system comprising an array of photo detectors between a direct detection mode and multiple coherent detection modes, the method comprising:
   receiving a signal beam;
   in a coherent detection mode of the multiple coherent detection modes, performing the steps of
      mixing the signal beam with a local oscillator beam to produce a combined beam;
      selecting one or more photo detectors of the array of photo detectors to receive the combined beam; and
      directing the combined beam to the selected one or more photo detectors of the array of photo detectors; and
   in the direct detection mode, performing the steps of
      adjusting one or more optical properties of the local oscillator beam;
      disabling the local oscillator beam based on the adjustments to the optical properties;
      selecting one or more photo detectors of the array of photo detectors to receive the signal beam; and
      directing the signal beam without mixing to the selected one or more photo detector of the array of photo detectors.

3. The method of claim 2, further comprising detecting the combined beam having a vertical, horizontal, or combined vertical and horizontal polarization based on adjustments to an amplitude of the local oscillator beam.

4. The method of claim 2, further comprising transmitting individually encoded transmitter signal beams out of photonic components based on the received signal beam.

5. The method of claim 2, further comprising optically switching the array of photo detectors between the direct detection mode and the coherent detection mode using the local oscillator beam having one or more adjustments to the optical properties.

6. The method of claim 5, wherein the optically switching comprises optically switching a photo detector in the array of photo detectors independent of optically switching the other photo detectors in the array of photo detectors.

\* \* \* \* \*